United States Patent [19]

Powell

[11] Patent Number: 4,615,530

[45] Date of Patent: Oct. 7, 1986

[54] METHOD OF SEALING BETWEEN RELATIVELY MOVABLE COMPONENTS

[75] Inventor: John G. Powell, Northridge, Calif.

[73] Assignee: Southern California Edison Company, Inc., Rosemead, Calif.

[21] Appl. No.: 766,278

[22] Filed: Aug. 16, 1985

Related U.S. Application Data

[62] Division of Ser. No. 480,851, Mar. 31, 1985, Pat. No. 4,558,656.

[51] Int. Cl.[4] .......................... F16J 15/32; G01K 7/04

[52] U.S. Cl. .......................................... 277/1; 277/26; 277/152; 277/165; 116/147; 340/405

[58] Field of Search ........................ 340/405; 116/147; 384/145, 146; 251/310; 277/1, 9, 9.5, 22, 26, 152, 153, 165

[56] References Cited

U.S. PATENT DOCUMENTS

| | | | |
|---|---|---|---|
| 3,062,555 | 11/1962 | Britton | 384/146 X |
| 3,277,797 | 10/1966 | Tyree et al. | 277/26 X |
| 3,394,939 | 7/1968 | Mastro | 277/1 |
| 4,369,977 | 1/1983 | Bishop et al. | 277/1 |

FOREIGN PATENT DOCUMENTS

| | | | |
|---|---|---|---|
| 55-163366 | 12/1980 | Japan | 277/26 |
| 508627 | 5/1976 | U.S.S.R. | 277/1 |

*Primary Examiner*—Robert S. Ward

*Attorney, Agent, or Firm*—Lyon & Lyon

[57] ABSTRACT

A siren comprises a compressed air supply which is deflected by stationary deflectors to exit radially through stator ports. A rotor with spaced ports rotates between the stator and deflector thereby opening and closing the stator ports. Stationary vanes are disposed at circumferentially spaced locations, and constitute together with the deflector plate and stator and rotor housing, plenums. There are fewer rotor ports than stator ports, which generates an out-of-phase acoustical pattern which creates an acoustic combination from the stator ports of an acoustic output at a distance from the siren which is more uniform spatially. The thermoplastic seal between the stator and the rotor has minimal clearance under operating conditions havign been run-in and plastically deformed at a temperature higher than for normal operation.

5 Claims, 5 Drawing Figures

METHOD OF SEALING BETWEEN RELATIVELY MOVABLE COMPONENTS

This is a division of application Ser. No. 480,851, filed Mar. 31, 1985, now U.S. Pat. No. 4,558,656.

BACKGROUND OF THE INVENTION

This invention relates to sirens. In particular, the invention is directed to a siren for circumferentially radial distribution of acoustic output for alerting communities, for instance, in emergencies at nuclear power stations or in events of other calamity.

Sirens can be of an integral blower-type siren where the sound generation includes an internal air compressor-rotary valve combination, and this inherently of low efficiency. The alternative siren design employs an axial flow which includes an external compressor. Although it incorporates efficient compression, it is only unidirectional, and the bending of sound into the radial horizontal plane creates inefficiencies such that the horizontal plane acoustic power generation is reduced. Turbulence of air in such a siren acts as a pneumatic or acoustic resistance to the siren.

As such therefore known sirens for warning and alerting operate at a relatively low acoustical efficiency. The efficiency is a measure of the acoustical output, usually in the horizontal plane, relative to the electrical or mechanical input power. In the Applicant's experience, this efficiency varies between 3% to 10% for commercially available sirens. In the known sirens where the acoustical output is generated in an axial direction, usually upwardly, a horn or the like is provided for turning the acoustical output to radiate in a horizontal direction. For a siren to be heard over a wider geographical area, it is desirable to radiate the acoustical output horizontally, and many of the commercially available sirens do not provide an internal mechanism for inherently creating such horizontal radiation. It is only by the provision of the appendaged horn that this horizontal radiation is achieved.

The redirecting of this radiation pattern, either through the use of deflectors or bent tubes or horns, or by some similar guiding, reflecting or defracting mechanism, all result in a loss of available sound energy in the horizontal plane, compared to an inherently radially-radiating siren. This redirection of acoustical output impairs the acoustic efficiency of the siren performance.

A further problem which is encountered in known sirens is that the mechanism within the sirens generating the sound is of a nature which causes excessive turbulence of the compressed gas or air passing through the siren mechanism, such that the acoustical output and the efficiency is further reduced.

Furthermore, known sirens do not provide an efficient or adequate degree of a sealing action between moving parts such that leakage of compressed air between moving parts further impairs the output efficiency and causes turbulence within the acoustical generating mechanism.

When the relatively rotational ports are not in alignment, namely, the ports are closed, ideally no air should flow outwardly to the siren horn. In actual fact, there is always some air flow or leakage, and this leakage is a significant source of lost siren efficiency. The space between the inside wall of a stator member and outside wall of a rotor member is often only a few thousandths of an inch or less, but even with such close spacing the loss of efficiency is significant. Where in commercial, community-type warning sirens such close clearances are impractical, the losses are even higher. The seal for an application to a siren where there is relatively high speed between the inside face and the ouside wall of the stator and rotor, respectively, such speed being in the order of 10,000 feet per minute, or greater, presents a difficulty since this generates unacceptable heat and/or friction where the seal comes into contact with the stationary face of the stator. This heat and/or friction tends to destroy the seal and/or the rotor or stator, or to increase the torque requirements to unacceptable levels.

Another problem with sirens arises in the desirability to radiate the sound uniformly in the horizontal plane. This is often accomplished by employing four or more horns to distribute the sound as uniformly as possible in the circumferential horizontal plane.

Where there are spaced ports for outlets for horns circumferentially around the location of the siren the acoustical output generated from the one horn effectively diminishes or cancels the acoustical output from adjacent horns so that at locations remote from the siren the acoustical output is consequently diminished and the efficiency of the reception is reduced.

At any given observation point, the sound field will originate not only from the horn pointing most directly towards the observer, but also from all the other horns. Since the effective sources of sound are near the mouths of the horns, the sound from each horn will travel a distance dependent upon the relationship between the observation point and the horn geometry. With the observation point directly in line with one horn, there will be a series of siren-to-observer distances at which the sound from the two horns adjacent to the centrally positioned horn will travel exactly one-half of the acoustic wavelength, for the particular siren frequency, farther than the sound from the central horn.

The sound from the central horn would be exactly 180 degrees out of phase with the sound from the adjacent horns. Thus, if the siren has only three horns and the level from each off-axis horn was 3 dB less than that from the central horn at the observation point, complete cancellation would result and the sound level would be zero. At some other observation distance, the path length difference would be 1 wavelength, and the sound level would be 3 dB greater than if only one horn were radiating. Thus, the level would fluctuate from zero to 3 dB more than that from one horn alone. Similarly, if the observer traveled in a circle about the siren, the level would fluctuate as the relationship between the path length changed due to the changing geometry. A similar or somewhat more complex effect occurs when the siren has more than three horns. At a constant measurement distance from the siren, the level may fluctuate several dB above and below the median value.

The result is that the alerting effectiveness is less at some locations that at others the same distance from the sirens. With the horn arrangement of the invention, these undesirable acoustic characteristics are reduced, not by rotating the horns, which would result in undesirable mechanical reliability problems, but through internal design.

Accordingly, the distance from which a siren may effectively be heard will be markedly affected and reduced by these inefficient operating characteristics in known sirens.

There is accordingly a need to provide a siren which minimizes the above problems and provides a more efficient acoustical output, and, for this purpose, to minimize the air turbulence generation within the siren, and to insure that leakage of compressed air between moving parts is minimized. Furthermore, it is desirable to provide a siren where the acoustical outputs generated by different output ports of the stator are in a phase relationship relative to each other so that they complement each other, that in a spatial distribution at a removed distance from the siren the effective sound generation is additive and hence more efficient and more uniform.

SUMMARY OF THE INVENTION

A siren comprises a compressed gas supply means with a guide for directing the gas supply in a first flow direction. Stationary deflector means changes the gas flow direction substantially transversely to the first flow direction. Stator means is in substantial alignment with a rotor means and includes spaced stator port means. The rotor means with spaced rotor port means is mounted for rotation about an axis substantially parallel to the first gas flow direction, and stationary vane means with the deflector means and the stator means form plenums.

On rotor rotation the rotor ports move periodically into and out of alignment with the stator ports, thereby to permit the periodic egress of air from the plenums.

By having stationary deflector means to change the air flow direction from an axial direction to a radial direction smoothly, turbulence generation is minimized and the air flow is retained substantially laminar. With the stationary vanes spaced circumferentially about the axis, likewise no turbulence is created by a rotating vane action moving across the air flow. The air compression can then take place in the plenum defined between the deflector plates, vanes and stator, while there is a separate chopper or valving efficiency created by the rotating ported rotor. With the first flow direction being vertical and the transverse air flow direction being horizontal, a more efficient acoustical horizontal output is attained within the siren mechanism.

The number of ports in the rotor is fewer than the number of ports in the stator. The stator ports are substantially rectangular-type slots or slits, while the ports in the rotor are larger and rectangular, and more nearly of square dimensions. By having this ratio equal to 2:1 between the stator and rotor ports, as in one embodiment, adjacent ports are alternately simultaneously opened and closed. This generates a square wave acoustic output with omitted alternating pulses. The fundamental frequency is half that of one where the rotor ports and stator ports are equal in number. The second harmonic of the output is approximately the same amplitude as the fundamental frequency, and the acoustic combination of adjacent horns is a resultant double-frequency siren.

Since the ports on either side of an open port are closed and these ports would be the major source of the spatial fluctuation, with the remaining ports about the circumference contributing less acoustic energy in this direction, and the adjacent horns are no longer emitting sound simultaneously, the spatial fluctuation is substantially reduced at any remote location from the siren. In fact, pulse from adjacent ports combine acoustically in the far field to form an acoustic square wave from the constituent pulse trains.

This rotor and stator port relationship between the rotor and stator improves the acoustic reception at points remotely located from the siren.

Between the rotor and stator there is provided a seal to minimize air leakage between the two relatively spaced and moving components. The seal is of a material having a low coefficient of friction, ability to cold flow, a hardness less than the material of the stator against which it contacts, and a coefficient of thermal expansion greater than that of the stator and rotor.

The seal is run-in by operating it initially at a temperature higher than the normal operating temperature, and thereafter removing the heat such that a minimal spacing is obtained between the seal and stator during normal rotation of the rotor relative the stator. The seal is mounted about the ports of the rotor and includes a lip directed towards the stator for forming the seal with the stator component.

This characteristic reduces the ability of air to leak between the stator and the rotor, and hence the efficiency of acoustic generation is improved.

DESCRIPTION OF PREFERRED EMBODIMENTS

Figure 1:
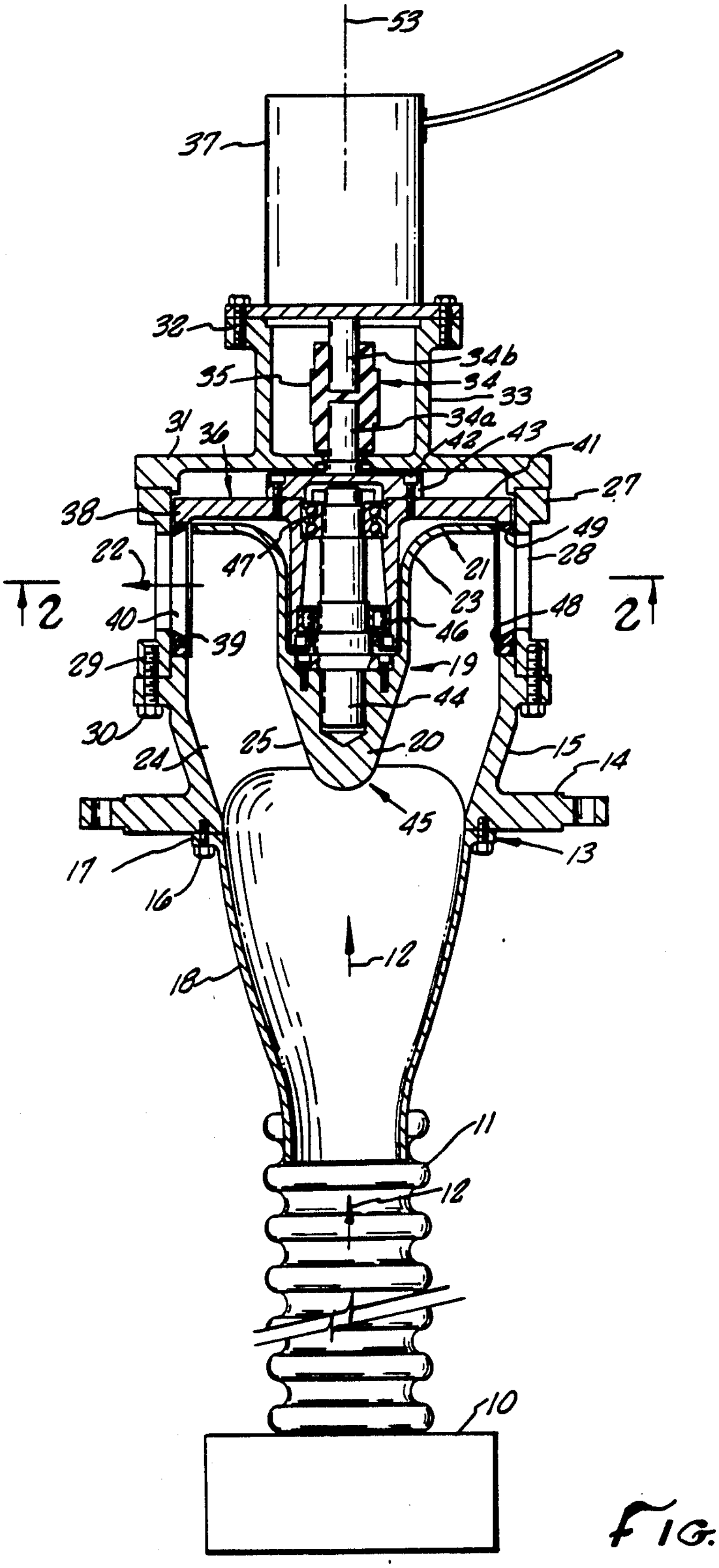
FIG. 1 is a sectional side elevation of a siren, without the acoustic horns.
Figure 2:
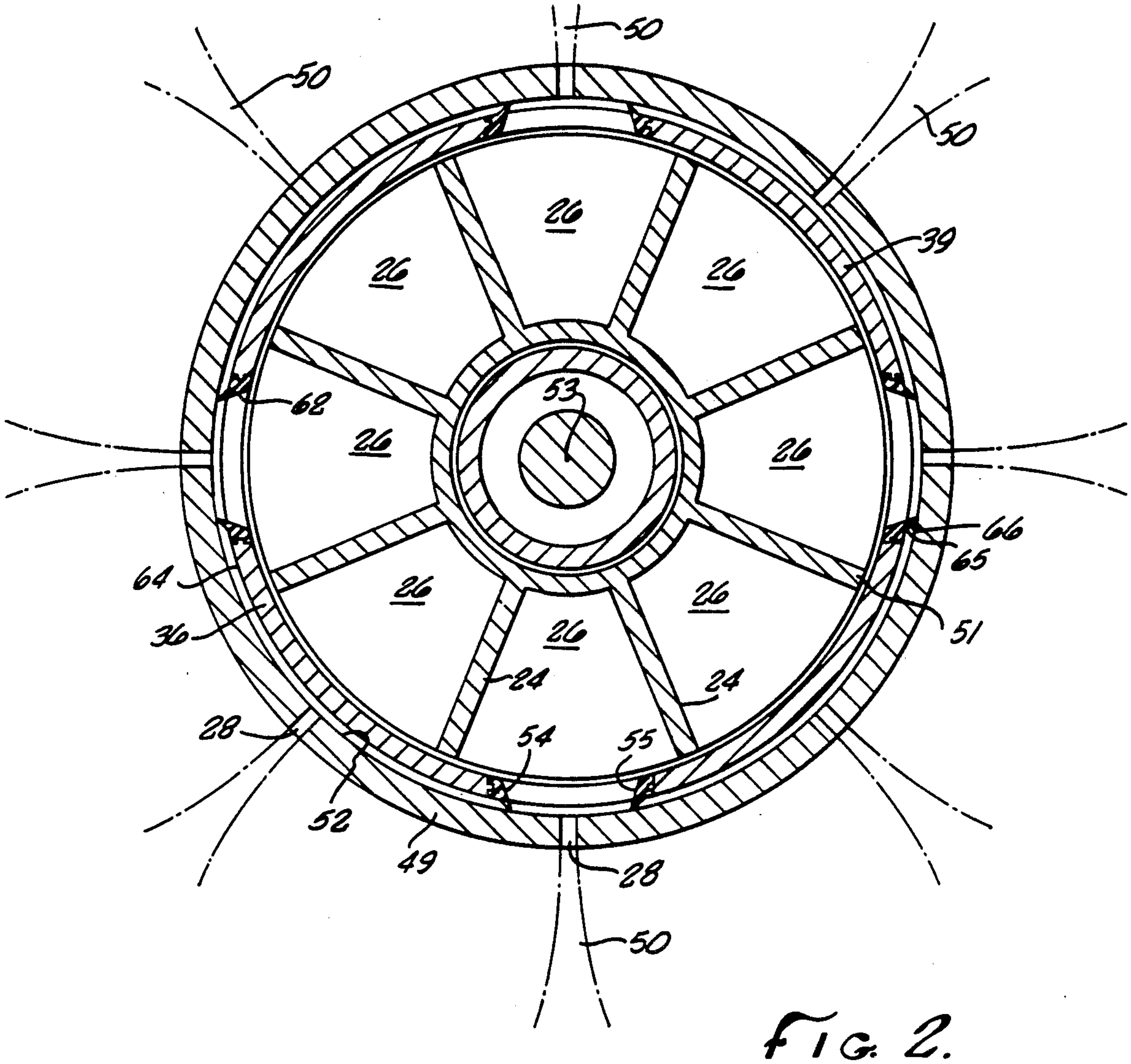
FIG. 2 is a sectional plan view along lines 2—2 of FIG. 1 illustrating the deflector, vanes, rotor and stator, with the horns shown in phantom.
Figure 5:
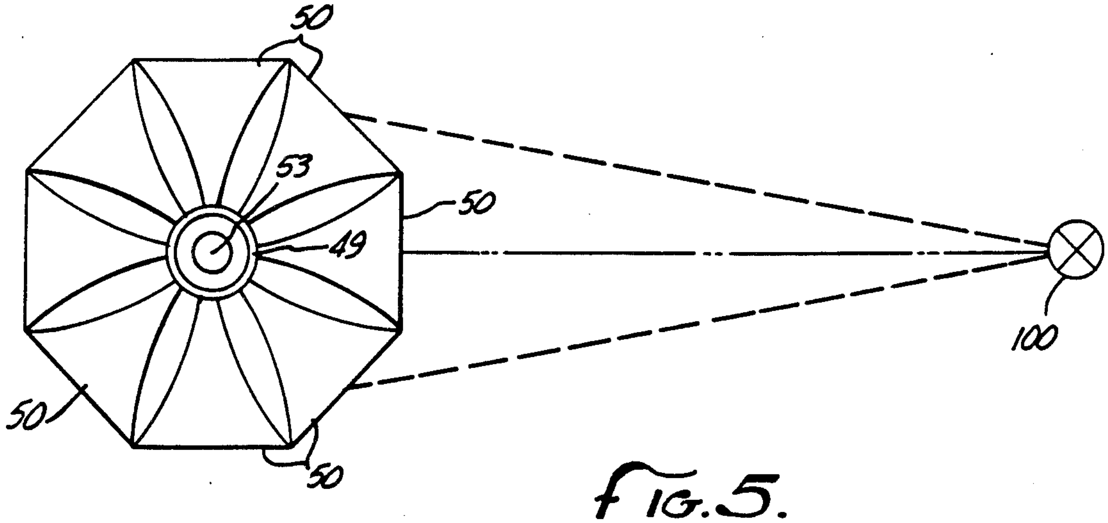
FIG. 5 is a plan diagramatic view illustrating the location of the siren and a remote spatial point in a horizontal plane, the horns of the siren being shown about the siren-generating mechanism.
Figure 3:
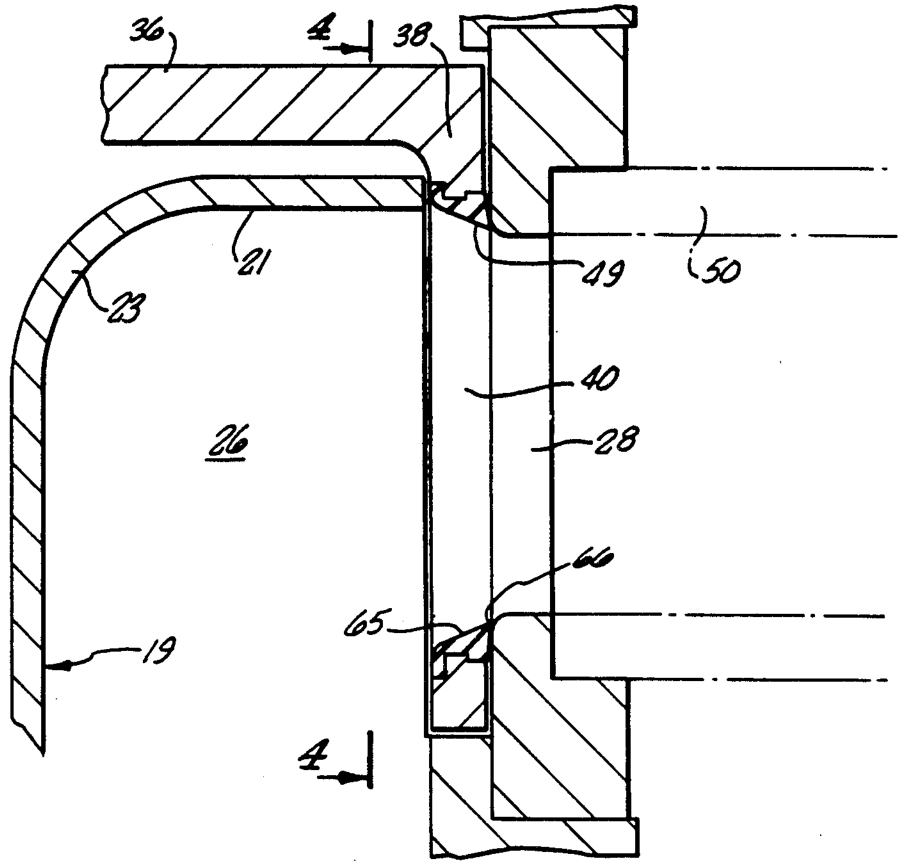
FIG. 3 is a detailed partial sectional side view illustrating the deflector plate, rotor, stator and seal means.
Figure 4:
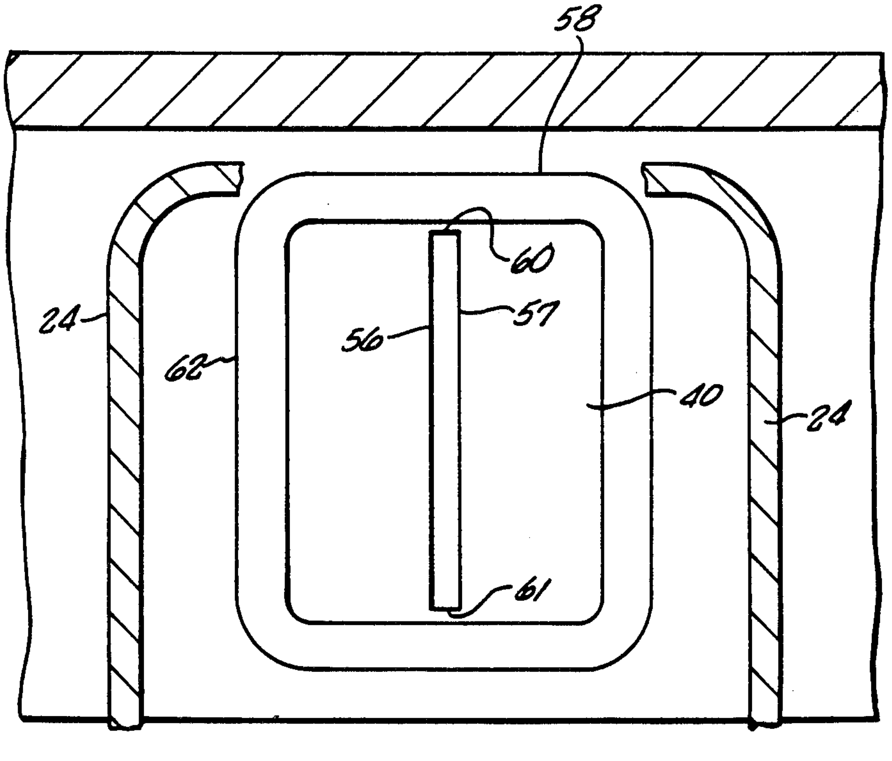
FIG. 4 is a view along lines 4—4 of FIG. 3 illustrating a rotor port with the vanes to either side of the stator port, the base of the deflector plate being omitted from view.

The siren comprises means for receiving a compressed gas supply means 10 which is diagramatically illustrated in FIG. 1. This compressed gas supply, which is conventionally an air supply generated by a motor and compressor, is connected with a duct 11 which directs the air supply in a first air flow direction indicated by arrow 12. The duct 11 is connected through an expanding tube extension 18 at the end 13 remote from the compressor 10 with a collar 14 of housing 15. The collar 14 provides apertures through which bolts 16 in a mating collar 17 are passed. The duct 11 itself is connected with an expanding tube 18 to the collar 14 of the housing 15.

A deflector element 19 of housing 15 includes a central hub or cup with a smoothly shaped outer faced head 20 which smoothly blends into the curved deflector elements 21 joined with the outer faced head 20 of the hub. The effect of the deflector 21 is to change the air flow direction 12 to a transverse air flow direction 22, which direction is radially outward from the axis defined by the first flow direction 12. The vertical elements 24 prevent rotational flow of air about the axis 53 of the siren. By having the cup outer face 20 smooth and a curved connection area 19 and 23 between the end face 20 of the cup and the deflectors 21, the change in air flow direction is effective with a minimum of turbulence.

Spaced circumferentially around the vertical axis 53 of the siren are vanes 24 which are affixed to the outside face 25 of the deflector element 19. The vanes 24, together with the deflector 19, act to sectionalize the air flow into the housing 15 of the siren into compartments 26. The deflector element 19 and vanes 24 are stationary, thus minimizing turbulent effects caused to the incoming air 12.

Parallel and in line with the central axis of the inflowing air 12, there is mounted a stator 27 with circumferentially spaced ports 28 around the stator. The stator includes of a cylindrical housing 29 with collar means through which bolts 30 pass to affix the cylindrical housing 29 to the base portion of the housing 15 to which the expander tube 18 is connected on the incoming side. The opposite side of the cylindrical tube contains a foundation plate 31 affixed to the cylinder 29 and the remote side 32 of the plate 31 contains an upstanding housing 33 for shaft means 34 and coupling sleeve 35 for rotatably driving a rotor 36 by means of a motor 37.

The rotor 36 contains a base plate 38 and a cylindrical sleeve 39 with ports 40 in the circumferential sleeve 39 and spaced about the sleeve 39. The base 41 of the plate 38 is anchored through stud means 42 to a plate 43 affixed to the one portion of the shaft means 34, namely **34*a* from the rotor 36 connected with the coupling 35. Through the motor 37, shaft means 34*a* and 34*b* from the motor 37 and coupling 35, effective rotation of the rotor 36** can thereby be obtained.

Within the central portion of plate 38 is an upstanding central sleeve 43 in which is mounted a shaft 44. The end 45 of the shaft 44 is lockingly energized in the inside of the deflector element 19, which is hollowed. About the shaft 44 there are spaced bearings 46 and 47 on which the rotor 36 is arranged to rotate. The bearings 46 and 47 are located substantially at either end wall 48 and 49, respectively, of the ports 40 of the rotor and also of the ports 28 of the stator. This provides stabilized location of the rotor 36 about the bearings 46 and 47 in relation to the ports 28 and 40 and insures a minimum movement of the rotor 36 at this critical position. Hence turbulence at the location of the ports 28 and 40 is further minimized. The plate 43 cooperates with the plate 38 at the one end to close effectively the central sleeve 43 in which the shaft 44 is housed.

Each compartment 26 constituted by the wall 49 of the stator 27, the adjacent vanes 24 and the deflector element 19 forms a plenum, the outlet of which is the stator port 28. The stator port outlets 28 are connected with horns 50 effectively to spread the acoustical output as desired in the radiated spatial horizontal direction. Between the radial ends 51 of the vanes 24 and the inside face 52 of the stator 49 rotates the rotor 36 with its ports 40. As the rotor 36 rotates, a chopper or valving function takes place whereby the plenums are opened to or closed from the stator port 28, such that as the ports 28 and 40 move into and out of alignment so the egress of compressed air from the plenum is regulated as acoustic output.

In the illustrated embodiment, there are eight compartments circumferentially spaced about the central axis 53, and there are eight stator ports 28 centrally located between adjacent vanes 24 forming the walls for each of these compartments. The rotor 36 contains a lesser number, namely four ports 40, thereby establishing a 2:1 ratio between the stator ports 28 and the rotor ports 28. This ratio can have other valves such as 8:7 or 8:5 or 7:5, for example.

The width of the rotor ports 40 in the direction of rotation, namely between side walls 54 and 55, is substantially greater than the length between the side walls 56 and 57 of the stator ports 28. The length of the rotor ports 40 between the end walls 58 and 59 are somewhat larger than the length of the stator ports 28 between the end walls 60 and 61 of the stator. The stator ports 28 represent substantially slits or slots relative to the substantially square ports 40 in the rotor 36. Thus, in the direction of rotation, there is periodic alignment between the rotor ports 40 and stator ports 28 such that air can pass from the plenums outwardly to the horns 50.

Between the rotor 36 and the stator 27 are seals 62 which minimize the leakage of air into the space 63 between the wall 52 on the inside of the stator 27 and the outside wall 64 of the rotor 36. The seals 62 are in the shape of a frame about the rotor port 40 and are shaped with an extending lip 65 extending towards the inside wall 52.

The bead or window-frame-like seal insert 62 around the periphery of the port 40 is run-in under controlled conditions to achieve the desired geometry under actual operating conditions. Initially the seal 62 starts with zero clearance, and although the seal 62 in the embodiment is located on the rotor 36, which revolves inside the stator 27, other permutations of seal 62 and rotor-stator location are possible. The seal material is Teflon (a DuPont Trademark for tetrafluoroethylene, polytetrafluorethylene or fluoronated ethylene propylene, generally referred to as fluorocarbons) or a Teflon with added graphites, melybdium disulphide or other material, or other non-metallic material. The necessary characteristics of the seal material are a low coefficient of friction against the working surface, the inside face 52 of the stator 27, the tendency to "cold flow", namely permanently to form under the application of pressure which property is accentuated in the presence of heat; machinability; a hardness less than that of the material against which it works, a coefficient of thermal expansion greater than that of the rotor and stator material.

The seal material 62 is machine molded or otherwise formed into the desired shape and attached to the rotor around each port 40 or in some other appropriate location. The rotor seal mechanism is then machined to the same or a slightly larger outer diameter as the stator bore diameter, namely a diameter greater than that determined by the inside walls 52. The seal 62 protrudes outwardly from the rotor face 64, thereby forming the raised lip 65, typically from 10- to 30-thousandths of an inch. The width of the seal is narrow, typically $\frac{1}{8}$ inch or less, and may be beveled so that only a chisel-like edge 66 is in contact with the stator face 52 when the rotor-seal assembly is inserted in the stator 27.

Starting at a temperature below the operating temperature, the rotor 36 is turned in the stator 27, beginning at a low speed and working up to the operating speed. Upon reaching operating speed, heated air, warmer than the operating air temperature, is injected into the siren air inlet through duct 11. Operation is continued under these conditions until the torque required to drive the rotor 36 stabilizes. At this time, first the warm air is shut off, then after the torque has dropped, the rotor drive motor 37 is turned off.

This process or its equivalent accomplishes two objectives. First, the seal 62 has "cold flowed" so the detailed seal profile conforms very closely to the stator profile defined on the inside wall 52. Second, the seal 62 has "cold flowed" so that the seal 62 to stator clearance is finite at ambient, quiescent conditions, and near zero or minimal under operating conditions. Due to the difference in thermal expansion coefficients, the seal 62 contracts at ambient temperature to leave a finite clearance between the seal 62 and the stator face 62. This minimizes the starting torque required to bring the rotor 36 up to operating speed, and it allows dust or foreign matter which would accumulate during non-operating periods to be blown and wiped out of the space 63 between the rotor 36 and stator 27, thereby minimizing abrasion.

Since the air emitted by the compressor 10 through the duct 11 is warmer than the ambient air, the seal will expand as operation commences, closing the clearance gap due to its higher thermal expansion and its intimate contact with the warm air. However, since the initial "cold flowing" operation was performed at a temperature higher than the operating temperature, a small, substantially minimal seal-stator clearance exists at the operating conditions.

This circumvents one of the major reasons it has not been possible to use seals 62 of this or other materials for high-surface-speed applications in the past, namely a build up of heat due to rubbing friction, it results in temperatures beyond the limits of the seals 62 and/or the material of which the stator 27 is made. At the same time, if a small area of contact does occur between the edge 66 of the seal and the inside face 52 of the stator 27, the use of a soft and "cold flowable" seal material tends to exhibit a self-healing characteristic as opposed to an avalanche-type degeneration to catastrophic failure characteristic of other material combinations.

The seal material characteristics described herein permit operation with near-zero or substantially minimal clearance seal conditions, and the resultant application to the siren is of substantially increased efficiency.

Other applications of the seal formation and establishment technique exist particularly when there is a relatively high speed interaction between two components which move relative to each other, for instance in application of pumping gas.

A further feature of the siren which provides for increased efficiency of the acoustic sound source arises from the phase cancellation reduction characteristic of the siren.

Utilization of the unequal number of rotor ports 40 and stator ports 28 effectively provides a precession by introducing a phase vector about the vertical axis of the siren. The rate is sufficiently great so as to be undetectable to the ear. This is achieved since the stator ports are non-aligned at all times with the rotor ports so that the ports are not opened and closed simultaneously.

The unequal combinations will have an effect where one port 28 is fully open, while other ports 28 are partly open, and other ports 28 are less fully open, and other ports 28 are in various stages of being opened or closed. Thereby, the phase relationship between the acoustic output from the different horns 50 is changed, and this phase rotation or precession has the effect of performing a spatial averaging of the sound level at the observation point 100, since two horns that are out of phase (cancelling) at one instance of time are in phase (enhancing) at a subsequent instance of time. Thus, the resultant sound field is more spatially uniform.

By having the ports 28 and 40 square or rectangular, the resultant abrupt chopping of the air flow results in basically a square wave sound generator. Special port shapes would be required to generate a sine wave. This square wave generator of the embodiment capitalizes on the inherent square wave generation by utilizing twice the number of stator ports 28 (and horns 50) as rotor ports 40, namely a ratio of 2:1.

In this embodiment there are eight stator ports 27, and four rotor ports 40. In this case, any given horn 50 does not emit a square wave, because every other pulse comprising the square wave is missing. Rather, each horn 50 emits a pulse train of 50% duty cycle. The horn 50 on either side of this horn 50 emits the missing part of the square wave. These acoustic pulse trains combine in the radiated sound field to produce the resultant opposite sound wave at the observation point 100.

The fundamental frequency is one-half that of the eight-port rotor, namely, with a ratio 1:1 relative to the stator ports, with the same rate of rotation, but due to the acoustic combination of the output of adjacent horns 50, the second harmonic is of approximately the same amplitude as the fundamental. The result is thus a double-frequency siren.

Since the horns 50 on either side of a given central horn 50 are the major source of the aforementioned spatial fluctuation, with the remaining horns contributing less acoustic energy in this direction, and since adjacent horns 50 no longer emit sound simultaneously, the spatial fluctuation is greatly reduced by this method. The circumferential sound level fluctuations at observations points 100 circumferentially about the siren are in the order of 2 dB, whereas in the prior art this variation is in the range of 4 to 6 dB.

The characteristics of phase cancellation and reduction are not limited to siren embodiments and could equally be applied to mechanical sirens and electronically, and to electronic sirens or other arrays or distributions of loud speakers. Furthermore, the shape of the ports and the ratio of stator ports to rotor ports could be different for different applications. Embodiments employing 8 stator ports and 7 rotor ports, and other combinations of port numbers have been evaluated and are practical.

The stator port to rotor port ratio in the range of 8:7, or 8:5 or 7:5 is a non-integral multiple of the other and this provides a smooth spatial distribution of sound in the horizontal plane at a distant point. There can also be a substantially continuously varying port to port relationship of the acoustic output. The port arrangement and geometry is such that at various times all the ports are closed.

This unique combination of an external air source which has been employed with axial flow siren designs of the prior art with a circumferentially distributed radial flow of air and sound markedly improves the desirable operational characteristics of the previous siren designs. Incorporating the improvements of the characteristic of non-turbulent radial air flow; air compression function separated from the chopper or valving function of the rotor; an improved sealing quality between the rotor and stator space, and the rotor port and stator port dimensions and relative number ratio, the obtained siren is one which is a substantial improvement over existing sirens.

The unique combination of design features disclosed result in a horizontal-plane siren efficiency typically 4 to 20 times that of existing commercial designs.

Having described the invention with particular reference to the preferred embodiments thereof, it will be obvious to those skilled in the art to which the invention pertains after understanding the invention, that various changes and modifications may be made therein without departing from the spirit and scope of the invention as defined by the claims appended hereto.

What is claimed is:

1. A method of establishing a seal between spaced relatively high-speed moving components, comprising locating between the components a sealing material having a low friction coefficient, ability to cold flow, and hardness less than that of a component against which it moves, the seal material being slightly larger than the space between the components, moving the components relative to each other towards a speed approaching normal operational speed between the components, heating the components and seal to a temperature higher than normal operating temperature to form an effective sealing action under temperature conditions higher than at a normal operational speed and thereafter removing the heat whereby a requisite sealing action is attainable for normal operating temperature and operational speed.

2. A method as claimed in claim 1 including maintaining the higher temperature until the relative torque required to establish movement under heated conditions is substantially stable.

3. A method is claimed in claim 2 including selecting the one component as a rotor and mounting the seal thereon, and selecting the second component as a stator mounted in relation to the rotor.

4. A method is claimed in claim 3 including selecting the material with a coefficient of thermal expansion greater than that of the components and wherein on starting for subsequent normal operation, a finite clearance exists between the seal material and the stator, thereby minimizing the starting torque and permitting foreign matter expulsion from the area between the rotor and stator prior to reaching operational speed.

5. A method is claimed in claim 4 wherein the seal material deforms to adopt a requisite shape in case of contact with the stator.

* * * * *